Figures 1, 2:
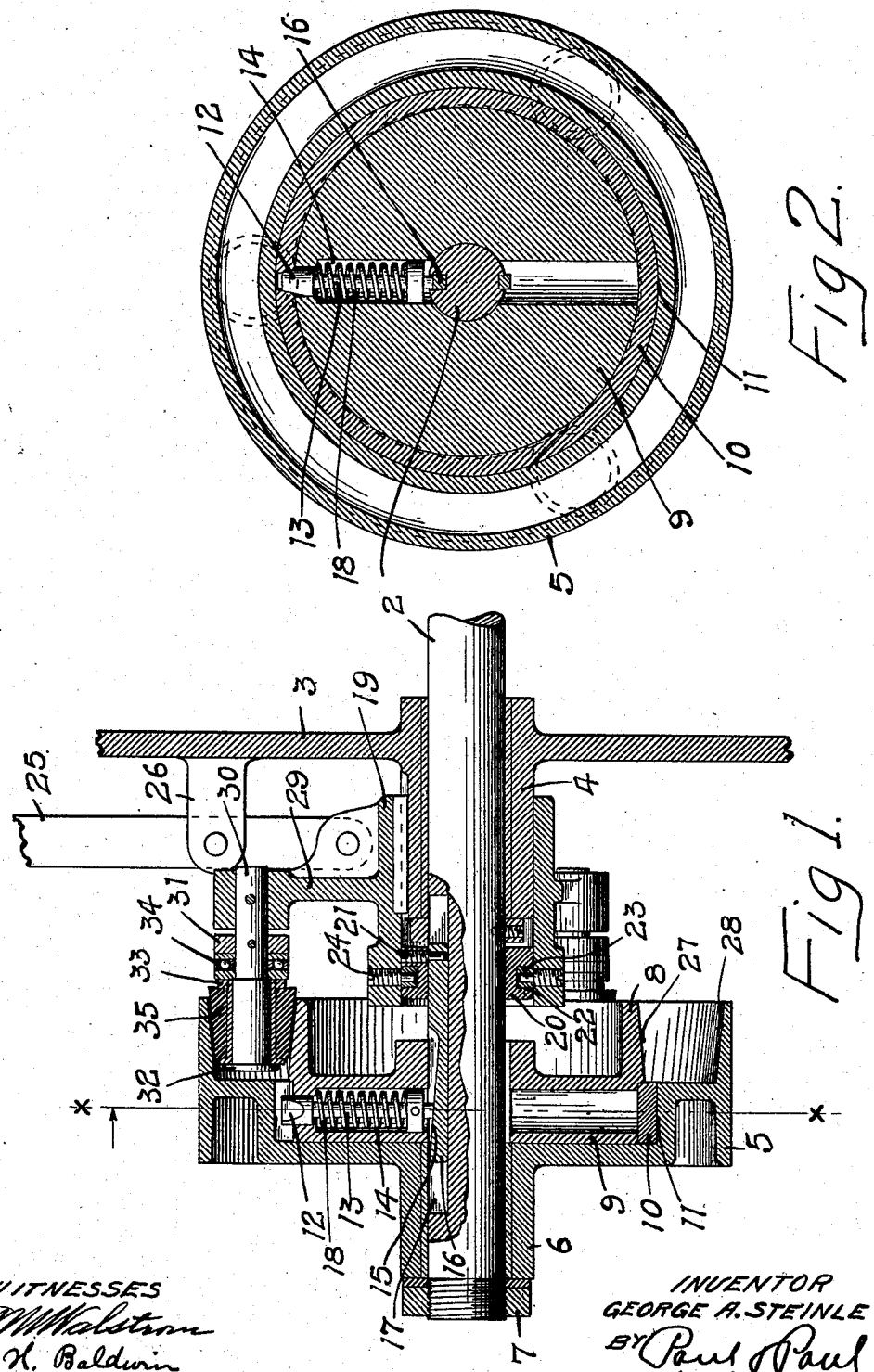

G. A. STEINLE.
CLUTCH GEARING.
APPLICATION FILED JAN. 11, 1908.

915,900.

Patented Mar. 23, 1909.

WITNESSES

INVENTOR
GEORGE A. STEINLE
BY
HIS ATTORNEYS

UNITED STATES PATENT OFFICE.

GEORGE A. STEINLE, OF MADISON, WISCONSIN, ASSIGNOR TO STEINLE TURRET MACHINE COMPANY, OF MADISON, WISCONSIN, A CORPORATION OF WISCONSIN.

CLUTCH-GEARING.

No. 915,900.      Specification of Letters Patent.      Patented March 23, 1909.

Application filed January 11, 1908. Serial No. 410,366.

*To all whom it may concern:*

Be it known that I, GEORGE A. STEINLE, of Madison, Dane county, Wisconsin, have invented certain new and useful Improvements in Clutch-Gearing, of which the following is a specification.

My invention relates to pulley clutches and the object of the invention is to provide a clutch device whereby a pulley is rendered reversible with a single belt. Generally several pulleys and belts, one of them twisted, have been necessary to produce the desired movement of the shaft. My present invention dispenses with all these heretofore necessary parts and permits the inclusion with the pulley of mechanism for causing a forward or reverse movement.

A further object is to provide a clutch mechanism which will be simple in construction and positive and reliable in its action.

The invention consists generally in various constructions and combinations, all as hereinafter described and particularly pointed out in the claims.

In the accompanying drawings, forming part of this specification, Figure 1 is a detail sectional view of a clutch mechanism embodying my invention. Fig. 2 is a sectional view on the line $x$—$x$ of Fig. 1.

In the drawing, 2 represents a shaft journaled in a portion of the frame 3 of the machine. The device is designed particularly for use on lathes and the part 3 represents a portion of the lathe frame. I have not thought it necessary to illustrate the complete machine as I make no claim to the same in this application. Furthermore, I do not wish to confine myself to the use of this clutch mechanism with a lathe as it is capable of a variety of other applications.

4 is a fixed hub mounted on the machine frame and forming a long bearing for the shaft.

5 is a loose pulley having a hub 6 journaled on the shaft and driven from a line shaft through a belt connection (not shown). This pulley normally runs idle when the parts are in the position indicated in Fig. 1. The removal of the lock nut 7 on the end of the shaft permits access to the bearing of the pulley and its removal.

8 is a cone keyed on the shaft 2 and inclosed by the pulley 5. This cone has a hub 9 that is inclosed by a split expansion ring 10 which normally has sufficient tension to grip the surface of the hub. The pulley is provided with a friction surface 11 inclosing the said ring and the tension of the ring is sufficient to normally hold it out of contact with the friction surface 11.

12 is a wedge adapted to fit between the ends of the expansion ring 10 and separate the same, said wedge being carried by a pin 13 arranged within a socket 14 in said hub and having its inner end in engagement with a cam surface 15 provided on a sliding key 16. This key is adapted to move back and forth in a way 17 provided in the periphery of the shaft 2 and the end of the pin is held in engagement with the key by a coiled spring 18. When the pin is moved outwardly the wedge 12 is forced between the ends of the expansion ring and the ring is expanded until it contacts with and grips the friction surface 11 on the pulley, whereupon the pulley will be locked on the cone and its motion will be transmitted through the cone to the shaft to drive it in the same direction. As soon as the key is moved to release the pin the spring 18 will withdraw the wedge, and the tension of the expansion ring will contract it sufficiently to grip the hub of the cone and release the friction surface of the pulley, whereupon the pulley will again run idle.

Various means may be employed for operating the sliding key. I prefer to provide the mechanism which I will now describe in detail.

19 is a sliding hub splined on the fixed hub 4.

20 is a collar arranged to slide on the shaft 2 and connected to the sliding key 16 by a screw pin 21. This connection allows the collar to slide lengthwise on the shaft but prevents its rotation thereon. The collar is provided with an annular groove 22 and blocks 23 fitting therein at intervals and adapted to slide in said groove. Screw pins 24 pass through the hub 19 into the said blocks and when the collar is revolved with the shaft the blocks slide in the groove while the hub 19 remains stationary. To operate the sliding hub I provide a lever 25 pivoted at one end to the hub and pivoted near said hub on a lug 26 that is mounted on the frame 3. Movement of this lever toward the left will slide the hub away from the pulley, move the sliding key also and force the wedge 12 outwardly between the ends of the expansion ring and expand the said ring sufficiently to clamp its outer surface against the friction surface 11 of the pulley. It is sometimes desirable to drive the shaft in the opposite direction from the movement of the pulley and to accomplish this I prefer to provide the following described mechanism:— The cone has a conical friction surface 27 and the pulley has an oppositely flaring similar surface 28 inclosing the cone surface. Between these two surfaces an annular space is formed, the walls of which diverge from the middle of the pulley toward the end thereof. Upon the sliding hub I provide a series of brackets 29. There are preferably three of these brackets arranged equidistant on the hub. In the outer ends of these brackets pins 30 are mounted and arranged to extend parallel with one another and with the shaft 2. Disks 31 are secured on said pins and the ends of the pins are provided with heads 32. Spools 33 are mounted on the said pins and contact at one end with the heads 32 and are provided at their opposite ends with antifriction bearings 34 that are arranged between the spools and the disks 31. The spools are thus allowed to turn freely on the pins. Upon the spools conical friction rollers 35 are mounted. These rollers are preferably made of hard fiber though any suitable material may be used and their taper corresponds to that of the friction surfaces 27 and 28, so that when the rollers are forced in between the surfaces they will seat themselves snugly against these surfaces and perform the functions of gears for driving the cone and shaft from the pulley but in an opposite direction. I prefer to provide three of these friction rollers arranged equidistant from one another around the periphery of the cone as indicated by dotted lines in Fig. 2, thus insuring the proper centering of the parts and the equalizing of the strain and rendering the clutch positive and reliable in its action. The movement of the lever 25 toward the right will cause these friction rollers to be seated against the friction surfaces of the cone and pulley and drive the shaft and cone in a direction opposite to the movement of the pulley.

I claim as my invention:

1. The combination with a shaft, of a pulley loosely mounted thereon, a cone secured on said shaft within the circumference of said pulley, said pulley and cone having opposing friction surfaces, a hub having a sliding movement on said shaft toward and from said pulley, a key slidably mounted in said shaft and connected with said hub, means carried by said cone and actuated by the movement of said key, when said hub is moved in one direction for locking said cone and pulley together and means carried by said hub and adapted to engage the opposing surfaces of said pulley and cone when said hub is moved in the other direction, and an operating lever for said hub.

2. The combination with a shaft, of a pulley loosely mounted thereon, a cone secured on said shaft within the circumference of said pulley, said pulley and cone having opposing friction surfaces, a hub having a sliding movement toward and from said pulley, radially moving means mounted in said cone and adapted to lock it and said pulley together, means connected with said hub and arranged to actuate said radial moving means when said hub is moved in one direction, means carried by said hub and adapted to engage said opposing surfaces and form a means for transmitting movement between said cone and pulley and a lever pivoted at a point intermediate to its ends and connected at one of its ends to said hub for the purpose specified.

3. The combination with a shaft having a longitudinal recess therein, of a pulley loosely mounted on said shaft, a cone secured on said shaft and inclosed by said pulley, said pulley and cone having opposing friction surfaces, a hub slidably mounted and inclosing said shaft, a key arranged in said recess and having an inclined surface and connected with said hub, radially moving means carried by said cone and engaging said friction surface and actuated by the movement of said key for locking said cone and pulley together when said hub is moved in one direction and means carried by said hub and engaging said opposing surfaces to form a transmitting agency between them when said hub is moved in the other direction, substantially as described.

In witness whereof, I have hereunto set my hand this 18th day of December 1907.

GEORGE A. STEINLE.

Witnesses:
G. S. MARTIN,
WM. R. BAGLEY.